(12) United States Patent
Rivera

(10) Patent No.: US 10,287,738 B2
(45) Date of Patent: May 14, 2019

(54) SEALED UNDERWATER AIR CURTAIN SYSTEM

(71) Applicant: Destino Miguel Rivera, Glen Cove, NY (US)

(72) Inventor: Destino Miguel Rivera, Glen Cove, NY (US)

( * ) Notice: Subject to any disclaimer, the term of this patent is extended or adjusted under 35 U.S.C. 154(b) by 0 days.

(21) Appl. No.: 14/999,679

(22) Filed: Jun. 11, 2016

(65) Prior Publication Data
US 2016/0362860 A1  Dec. 15, 2016

Related U.S. Application Data

(60) Provisional application No. 62/230,806, filed on Jun. 13, 2015.

(51) Int. Cl.
| | |
|---|---|
| *E02B 3/06* | (2006.01) |
| *E02B 3/12* | (2006.01) |
| *E02B 1/00* | (2006.01) |
| E02B 15/10 | (2006.01) |

(52) U.S. Cl.
CPC ............ *E02B 1/006* (2013.01); *E02B 1/003* (2013.01); *E02B 15/108* (2013.01); *Y02A 20/204* (2018.01)

(58) Field of Classification Search
CPC ............... E02B 3/06; E02B 3/12; E02B 3/121
USPC .................................................... 405/21–35
See application file for complete search history.

(56) References Cited

U.S. PATENT DOCUMENTS

| | | | | |
|---|---|---|---|---|
| 2,391,059 A | * | 12/1945 | MacFarren | B63G 9/00 114/240 R |
| 2,639,131 A | * | 5/1953 | Coombs | B01F 3/04262 210/220 |
| 3,334,816 A | * | 8/1967 | Mizuno | B05B 17/08 239/18 |
| 3,505,213 A | * | 4/1970 | Fulton | C02F 1/78 137/2 |
| 3,782,704 A | * | 1/1974 | Schramm | B01F 3/0412 138/112 |
| 3,860,983 A | * | 1/1975 | Furth | B63B 22/02 114/333 |
| 3,889,880 A | * | 6/1975 | Hruby, Jr. | B05B 17/08 239/18 |
| 4,048,072 A | * | 9/1977 | McCullough | B01F 3/04262 210/220 |
| 4,622,139 A | * | 11/1986 | Brown | B01F 3/04262 210/170.06 |
| 5,330,688 A | * | 7/1994 | Downs | B01F 3/0412 261/122.1 |

(Continued)

*Primary Examiner* — Benjamin F Fiorello
*Assistant Examiner* — Edwin J Toledo-Duran
(74) *Attorney, Agent, or Firm* — Collard & Roe, P.C.

(57) ABSTRACT

A system for forming an underwater air curtain, that turns the ocean above it into a gas is anchored on the ocean floor, so the curtain's bubbles travel from the ocean floor to the surface. The system is formed by arrays of air distribution tubes carrying air dispersal heads that are powered by an air supply and air batteries. In the shallows, of 30 ft. or less, ocean waves are deleted, oil is repelled, marine animals have a barrier that they cannot enter when the system is activated. Used at deeper depths, the system has the ability to change ocean temperatures, by using bubbles to bring cold water from the ocean floor to the surface thus protecting coral. The system also works as a sound barrier, because the ocean is no longer solid above it.

8 Claims, 6 Drawing Sheets

(56) References Cited

U.S. PATENT DOCUMENTS

| | | | | |
|---|---|---|---|---|
| 5,800,705 | A | * | 9/1998 | Downs ................ B01F 3/04269 210/177 |
| 5,863,031 | A | * | 1/1999 | Veeder ................ B01F 3/04262 261/122.1 |
| 5,879,105 | A | * | 3/1999 | Bishop .................... E02B 3/062 405/26 |
| 6,200,468 | B1 | * | 3/2001 | Schmit .................. B01F 3/0412 134/170 |
| 6,676,837 | B2 | * | 1/2004 | Keeton, Jr. ......... B01F 3/04113 210/620 |
| 7,850,151 | B2 | * | 12/2010 | Kim ....................... B01D 65/00 261/124 |

* cited by examiner

SEALED UNDERWATER AIR CURTAIN SYSTEM

BACKGROUND OF THE INVENTION

I have been scuba diving for over 30 years. I have worked in underwater construction, mainly in Puerto Rico. After the Tsunami that killed the 250,000 people in the area of India, the news media kept repeating the same lines to explain the event. A Tsunami is a solid wall of water, day in and day out. One day while heading to the ocean surface, I heard that line again while watching my bubbles head up before me. I asked myself, what if the ocean was no longer solid? This is how I came to create Poseidon's Curtain. The invention is an underwater air curtain that turns everything above it into gas. I worked on this for years and realized it had more than one application. Up until now, people have tried to make air curtains by using compressed air, and all were pushing water to try to get the effect that they wanted.

SUMMARY OF THE INVENTION

There are 3 main components to the invention: the air battery, the air distribution tubes and the air dispersal heads. Each one of these are protected from flooding the other via one way valves. The air dispersal heads release air via pressure relief valves and individual one way valves. The air batteries are fed from the surface, either on land or from barges. The system is a sealed system, this means it is always energized and can protect whole coastlines. The systems are varied for filling the air batteries, they can be anything from a high volume centrifuge fan, the bypass of the 747 engine or other engines, or a storage tank such as for large natural gas storage. The latter refers to compressed air. At this time the industry uses mostly compressed air, so they can push water out of the lines.

This is used for sound reduction in undersea hammer construction, such as pile driving. The invention in general is 10 ft. wide, but with other redundant systems could be as much as 100 feet wide. What this means is it can cancel out large waves. As a diver I have been in 6, 10 and 15 foot seas. On the surface it is doom and gloom, but once you drop below the waves, it is calm. The waves ride on this calm water; the whole ocean is not moving.

The invention is anchored to the ocean floor, so the air curtain moves from the floor to the surface.

There are 2 parts to a wave: a positive and a negative. The positive is the wave on the surface and the negative is a wave most people don't know exists. The negative wave runs on the ocean floor. Therefore, this curtain cancels out both the positive and negative waves in the ocean. What this means is if you have a 6-foot wave, with a 10-foot-wide base, it dies, there is nothing underneath it to support it. It is as if the wave rolled off of a table. The curtain has other properties as well, as the bubbles rush to the surface, it creates a current pushing everything away from it. Remember that no two objects can occupy the same space at once. As the bubbles hit the surface, it pushes debris and oil away from it. Underwater, it creates a barrier that pest like jelly fish at nuclear power plants and sharks at beaches as well as many microbes will be slowed if not stopped like red tide. Sediments are also collected, like sands that can be reclaimed for reuse at beaches. Having a 10-foot-wide corridor will also stop greater subsea noise like underwater construction or detonations. By changing the size of the hole size in the dispersal heads and anchoring the system in the area of 100 ft. of water, we can change the ocean temperatures. The heads can create 14 to 18 inch bubbles, then act as a plate that gets bigger as it goes to the surface carrying the cold water from below. The constant slow movement of these bubbles to the surface, then cool the surface. As high tide comes in, it will bring the cold water to bath the coral closer to shore, thus stopping coral bleaching.

Since the system is a sealed system, it can be energized when you need it as it always is charged with air. This means an installed system is used only when there is a storm or oil spill. Also there are areas that have seasonal needs like fending off jellyfish, sea lice or sharks from an area. And finally changing ocean temps to protect coral. Monthly inspection is needed to make sure the heads are clean and this means inspection crews need to energize the system at least once a month. Even with a copper ablative paint on the heads in the ocean barnacles will eventually plug holes. This is the beauty of the 10 foot sections. The sections of heads can be changed in minutes. The system can be staggered as to let marine life or boats to pass around it.

The system according to the invention can be powered by any means of high output air systems. The system can be powered up by anything from a high output centrifuge fan to a 747 engine, depending on what your needs are or trying to accomplish. If one is looking at re-oxygenating a dead zone in a lake or ocean, the volume is not as high as repelling an oil spill and yet not as much as one will need to cancel out the waves of a hurricane or possibly a Tsunami. The most important factor is that the unit is sealed. This is accomplished by using a series of pressure relief valves and one way valves to the three parts of the system, being the air battery, the air distribution tubes and air dispersal heads.

The present invention is an underwater air curtain. The curtain is either anchored to the ocean floor or the system can be weighted down at deeper depths being tethered to barges above. The air curtain's bubbles are so dense that oil spills cannot pass over or through it. Anchored to the ocean floor, it creates a turbulence that pushes oil away as well as silt and small marine life, such as jelly fish. An ocean wave is a solid wall of water. The system creates so many bubbles that the ocean no longer solid. In short there is more gas that water and the oceans waves are no longer solid and are canceled out.

DETAILED DESCRIPTION OF THE DRAWINGS

Figure 1:
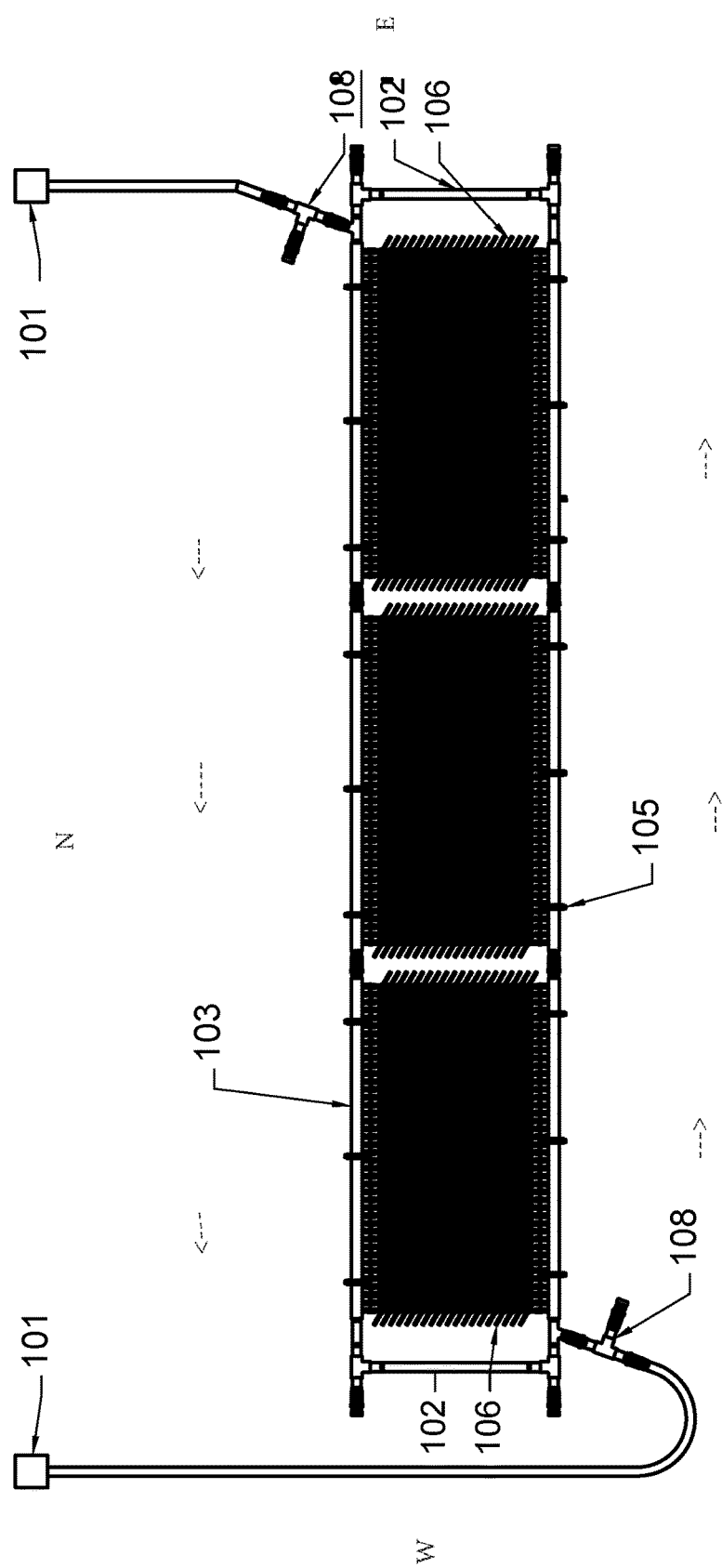
FIG. 1 is an aerial view showing the air supply on shore feeding the system according to the invention.

FIG. 1 shows the system according to the invention. The system is formed from two air supplies 101 connected via bleeder valves 108 to one each of two air batteries 103, which are configured for storing air from the air supply and are connected to each other by tubes 102 to form a closed system. Anchors 105 anchor the system to the ocean floor.

Anchors 105 can be manta ray anchors or rock anchors. The air supplies can be a high output air system such as a high output centrifuge fan, a source of compressed air, or a jet engine. Bleeder valves 108 can bleed the system if the lines need to be purged of water.

The arrows in FIG. 1 show the direction of air flow from the air supplies 101 through the system.

The system according to the invention is a closed system, so that once all components are assembled it is always charged with air.

Figure 2:
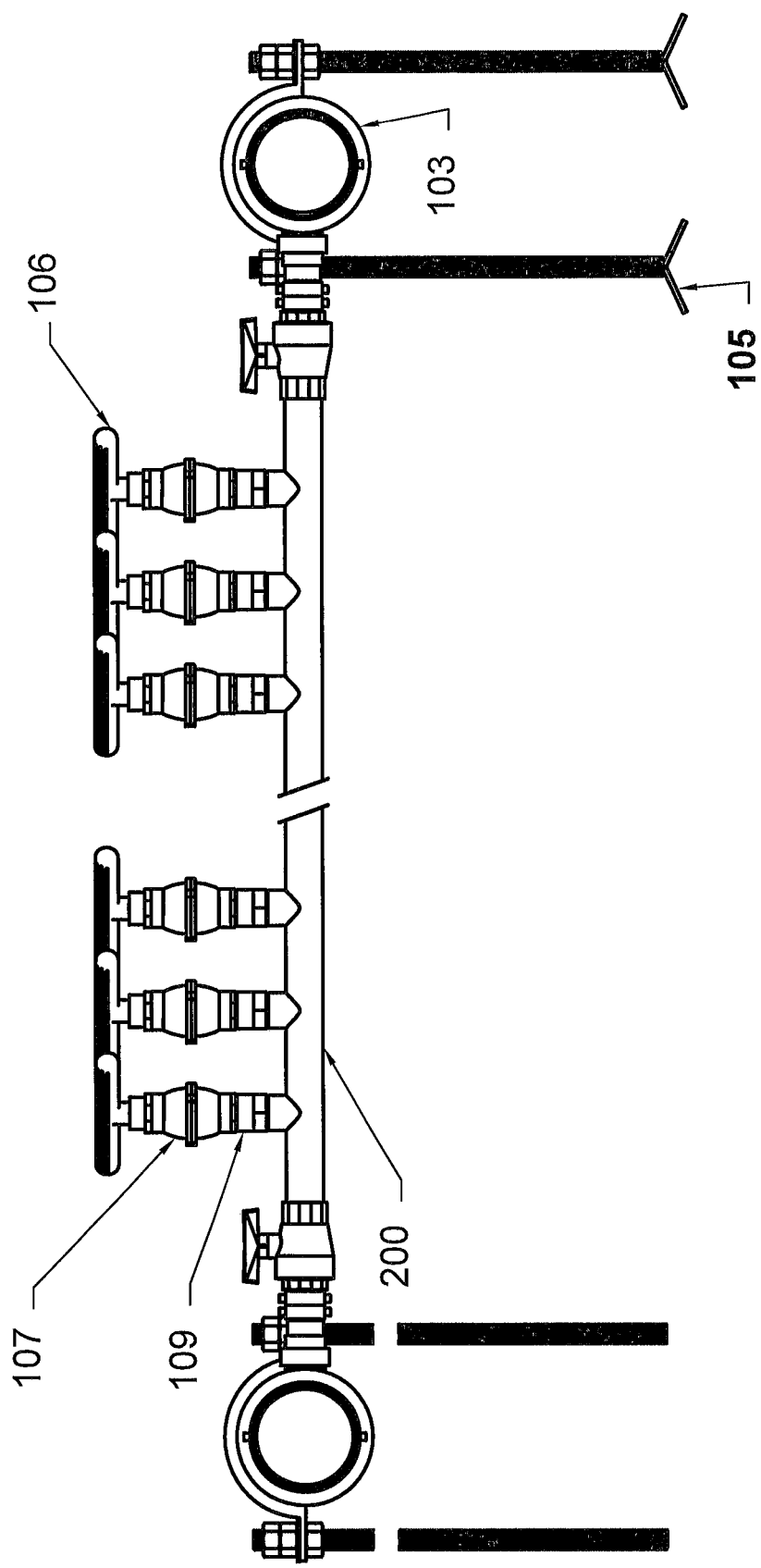
FIG. 2 is a cross-sectional view of the system of FIG. 1.

Arranged between the two air batteries 103 are a series of arrays 206 formed by parallel rows air distribution tubes 200 connected to a series of air dispersal heads 106 arranged along each air distribution tube. The rows of air distribution tubes are arranged perpendicular to the shoreline. The air batteries 103, air distribution tubes 200 and air dispersal heads 106 are all protected from flooding by one-way valves 107 such shown in FIG. 2. Pressure relief valves 109 can also be installed. Each array is preferably 10 feet wide. Individual arrays can be changed out based on need.

Figure 3:
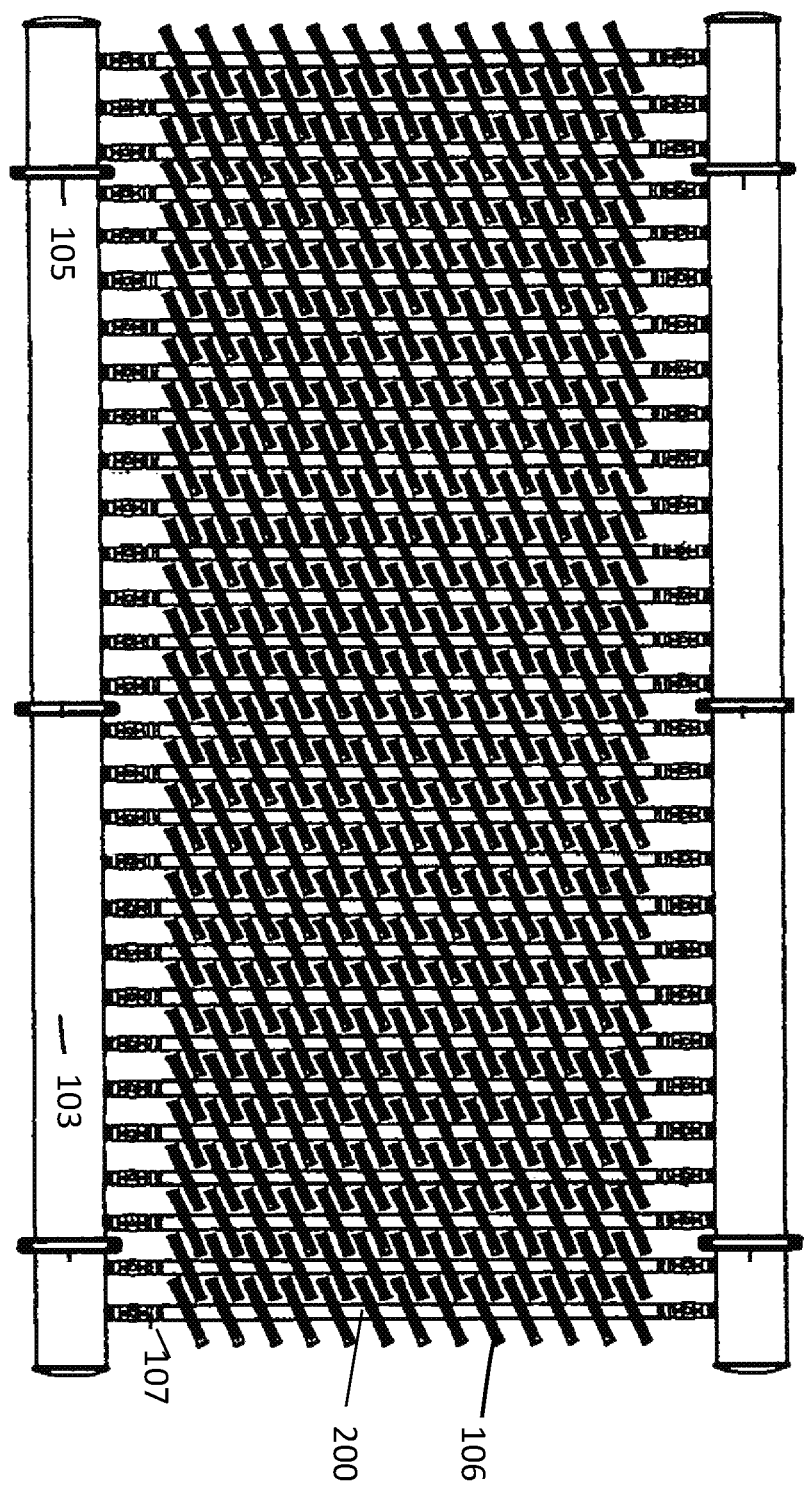
FIG. 3 is a top view of one array in the system according to the invention.
Figure 4:
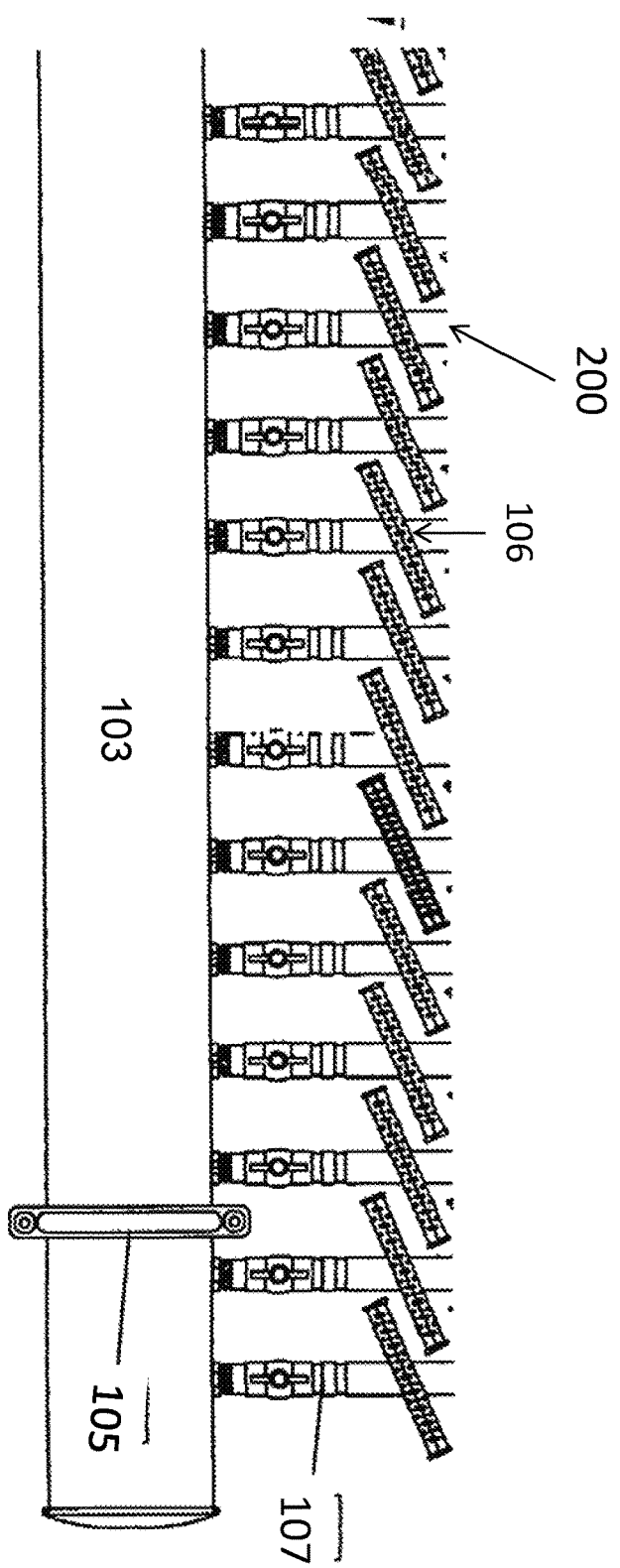
FIG. 4 is a partial enlarged view of the array shown in FIG. 3.
Figure 5:
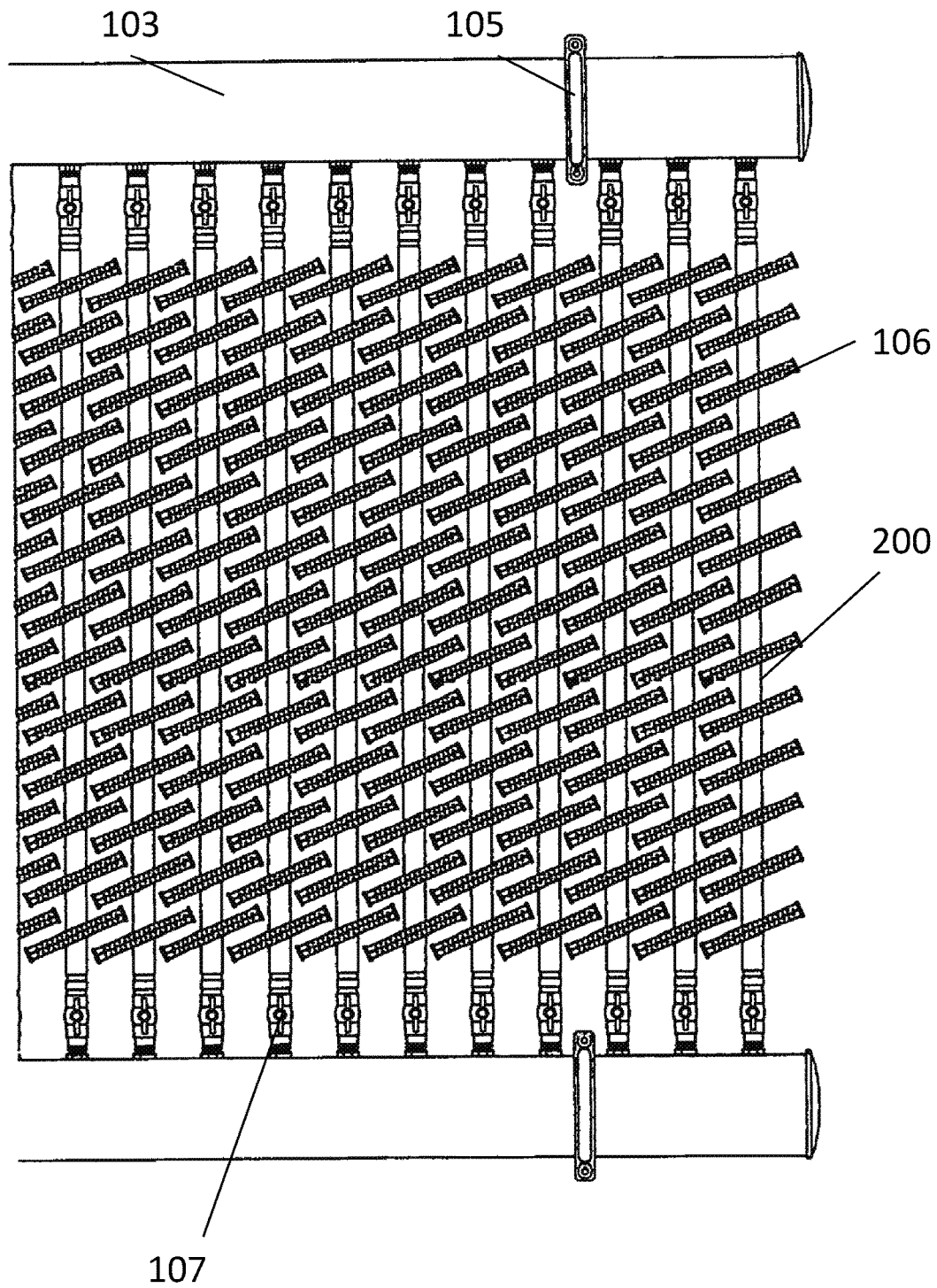
FIG. 5 is another partial enlarged view of the array shown in FIG. 3.

As shown in FIGS. 3-5, the air distribution tubes 200 are arranged one next to each other in between the two air batteries 103. The air dispersal heads 106 are arranged along each air distribution tube 200 so that a longitudinal extent of each head 106 extends obliquely to the longitudinal direction of each air distribution tube 200. In addition, each air dispersal head 106 is arranged offset in a longitudinal direction from an adjacent air dispersal head 106 on an adjacent air distribution tube 200. This creates a dense air bubble curtain when in use.

Figure 6:
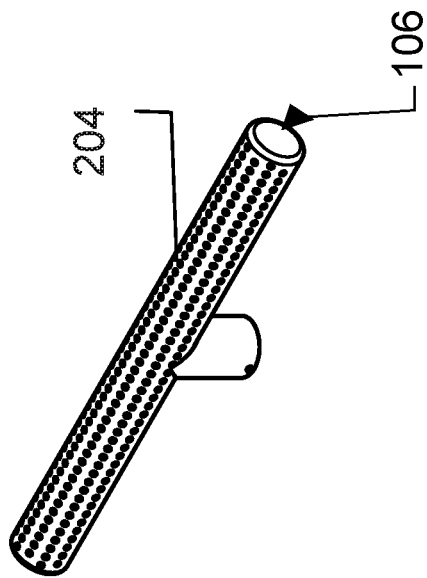
FIG. 6. shows the air dispersal head according to the invention.
Figure 7:
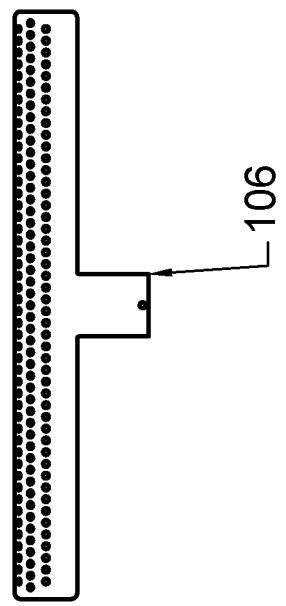
FIG. 7 shows a side view of the air dispersal head shown in FIG. 6.

The air dispersal head 106 is shown in FIGS. 6-7. Each head 106 is arranged with a series of air holes 204 along the top surface for releasing air bubbles into the ocean. The air holes 204 can be configured so that 14 to 18 inch bubbles are released. The system allows for air to be released through air dispersal heads to create a constant slow movement of bubbles toward the surface.

The invention claimed is:

1. A system for creating a curtain of air in a body of water, comprising:
   at least one air supply; and
   at least one array connected to the at least one air supply, the at least one array being configured for releasing air from the at least one air supply into the body of water, each one of the at least one array comprising:
   at least one air battery configured for storing air from the at least one air supply;
   a plurality of air distribution tubes arranged in rows and connected to the at least one air battery, and
   a plurality of air dispersal heads connected to the plurality of air distribution tubes, each air dispersal head of the plurality of air dispersal heads being formed from an elongated tube having a plurality of holes therein for releasing air from the at least one air supply, the elongated tube having a longitudinal direction running along a length of the elongated tube, and a connector section to one of the air distribution tubes, the connector section running perpendicular to the elongated tube, and
   at least one anchor configured for anchoring the system to a sea floor,
   wherein the plurality of air distribution tubes are arranged parallel to each other, wherein the longitudinal direction of each air dispersal head of the plurality of air dispersal heads is parallel to the longitudinal direction of the remaining air dispersal heads of the plurality of air dispersal heads and at an oblique angle to a longitudinal extent of the air distribution tube on which the respective air dispersal head is connected, and wherein each air dispersal head of the plurality of air dispersal heads is arranged offset longitudinally from an adjacent air dispersal head on an adjacent one of the air distribution tubes.

2. The device according to claim 1, further comprising at least one bleeder valve connected between the at least one air supply and the at least one air battery, said bleeder valve being configured for releasing liquid from the device.

3. The system according to claim 1, wherein the system comprises two air supplies and two air batteries, wherein each one of the air supplies is connected to a separate one of the air batteries.

4. The system according to claim 1, wherein the at least one air supply is selected from the group consisting of a fan, an air compressor and a jet engine.

5. The system according to claim 1, wherein there are a plurality of said arrays and wherein the at least one air battery of each array is connected to air batteries of an adjacent array.

6. The system according to claim 1, wherein the at least one anchor is connected to the at least one air battery.

7. The system according to claim 6, wherein the at least one anchor comprises a plurality of manta ray anchors.

8. The system according to claim 1, wherein each air dispersal head of the plurality of air dispersal heads is connected to one of the air distribution tubes via a one-way valve.

* * * * *